(12) United States Patent
Sivanesan et al.

(10) Patent No.: US 8,509,213 B2
(45) Date of Patent: Aug. 13, 2013

(54) METHODS FOR IN-BAND OVERLAY OF SMALL CELLS IN MACRO CELLS

(75) Inventors: Kathiravetpillai Sivanesan, Richardson, TX (US); Subramanian Vasudevan, Randolph, NJ (US)

(73) Assignee: Alcatel Lucent, Paris (FR)

( * ) Notice: Subject to any disclaimer, the term of this patent is extended or adjusted under 35 U.S.C. 154(b) by 679 days.

(21) Appl. No.: 12/659,201

(22) Filed: Mar. 1, 2010

(65) Prior Publication Data

US 2011/0211537 A1      Sep. 1, 2011

(51) Int. Cl.
*H04J 3/06*      (2006.01)

(52) U.S. Cl.
USPC ........................................................ 370/350

(58) Field of Classification Search
USPC ..... 370/324, 350, 329–330, 503–4, 509–514; 375/260–267
See application file for complete search history.

(56) References Cited

U.S. PATENT DOCUMENTS

| | | | |
|---|---|---|---|
| 2009/0135754 A1 | 5/2009 | Yavuz et al. | |
| 2010/0067517 A1* | 3/2010 | Song | 370/350 |
| 2010/0278132 A1* | 11/2010 | Palanki et al. | 370/329 |
| 2011/0080896 A1* | 4/2011 | Krishnamurthy et al. | 370/336 |
| 2011/0182252 A1* | 7/2011 | Liu et al. | 370/329 |

OTHER PUBLICATIONS

International Search Report dated May 27, 2011 for corresponding Application No. PCT/US2011/024958.
Motorola: "Text Proposal for FDD HeNB Control Interference Mitigation", Oct. 12, 2009, pp. 1-3.
John J. Benedetto et al.: "Construction of infinite unimodular sequences with zero autocorrelation", Sep. 18, 2008, pp. 191-207.

"3GPP TR 36.921 1.0.0 (Dec. 2009) Technical Report 3$^{rd}$ Generation Partnership Project; Technical Specification Group Radio Access Networks; Evolved Universal Terrestrial Radio Access (E-UTRA); FDD Home eNodeB (HeNB) Radio Frequency (RF) requirements analysis (Release 9)", Dec. 1, 2009, pp. 1-22.
Motorola: "Downlink control Protection in LTE", Feb. 17, 2010. pp. 1-5.
3GPP TS 36.201 V8.3.0, Mar. 2009, 3$^{rd}$ Generation Partnership Project: Technical Specification Group Radio Access Network; Evolved Universal Terrestrial Radio Access (E-UTRA); LTE Physical Layer—General Description (Release 8), 13 pages.
3GPP TS 36.214 V8.7.0, Sep. 2009, 3$^{rd}$ Generation Partnership Project; Technical Specification Group Radio Access Network; Evolved Universal Terrestrial Radio Access (E-ULTRA); Physical layer—Measurements (Release 8), 12 pages.
3GPP TS 36.211 V8.9.0, Dec. 2009, 3$^{rd}$ Generation Partnership Project; Technical Specification Group Radio Access Network; Evolved Universal Terrestrial Radio Access (E-ULTRA); Physical Channels and Modulation (Release 8), 83 pages.
3GPP TS 36.212 V8.8.0, Dec. 2009, 3$^{rd}$ Generation Partnership Project; Technical Specification Group Radio Access Network; Evolved Universal Terrestrial Radio Access (E-ULTRA); Multiplexing and channel coding (Release 8), 60 pages.

* cited by examiner

*Primary Examiner* — Mark Rinehart
*Assistant Examiner* — Peter Cheng
(74) *Attorney, Agent, or Firm* — Harness, Dickey & Pierce

(57) ABSTRACT

Provided is a method that includes determining a binary sequence based on a number of symbols in a frame associated with a macro cell. The method further includes performing an autocorrelation calculation on the binary sequence. The method further includes determining a time offset based on minimum values of the autocorrelation calculation. The method further includes broadcasting a control signal including the time offset to a plurality of small cells. The method further includes receiving the control signal including the time offset associated with the frame associated with the macro cell. The method further includes transmitting a frame associated with a small cell synchronized with a frame associated with the macro cell and offset in time by the time offset.

10 Claims, 8 Drawing Sheets

PRIOR ART

METHODS FOR IN-BAND OVERLAY OF SMALL CELLS IN MACRO CELLS

BACKGROUND OF THE INVENTION

Embodiments relate to small cell deployment within a macro cell in a wireless network.

Mobile radio frequency band(s) are both scarce and precious resources. After the inception of commercial mobile radio communication in the 1980's the numbers of subscribers have been growing exponentially. The underlying radio technology also has grown at a fast pace. In addition to conventional voice communication, data, video and real time gaming have been introduced.

These new services require a relatively higher number of bits transmitted in a unit time than conventional voice services. There are two main ways to achieve larger bit rate demands, first, efficient use of spectrum using advanced technology (based on, for example, multiple transmit and receive antennas) and, second, the use of a larger frequency band. As the frequency spectrum is already crowded the latter is often not feasible.

Introduction of the cellular concept in the 1980's allowed efficient reuse of frequency spectrums. A service area may be divided into hexagonal grids of cells which are further grouped into clusters of cells. The frequency band may be apportioned within and reused between the clusters so as to intelligently keep the co-channel interference low.

Next generation wireless technologies are based on code division multiple access (CDMA) technologies that are more robust to interference and thus universal frequency reuse or re-use of the same frequencies across cells was introduced m $2^{nd}$ and $3^{rd}$ generation CDMA networks.

Orthogonal frequency division multiplexing (OFDM) technology is the technique used for future 4G or International Mobile Telecommunications (IMT)-advanced networks. While OFDM is a spectrally efficient scheme and is also more suitable for multiple antenna techniques (MIMO), OFDM is more susceptible to interference. Therefore, the efficient and intelligent use of the frequency spectrum across cells is important for successful deployment of the OFDM networks.

Substantial research effort has been devoted to improve spectral efficiency, or in other words, frequency reuse of the OFDM system. Several solutions have been proposed, e.g., fractional frequency reuse (FFR) (dynamic and static), intercell interference coordination (ICIC) and small cell deployment (heterogeneous networks).

FFR uses a portion of the spectrum for a certain area of the cell. The portion of the spectrum is dynamically changed or allocated in a static manner. If the spectrum is dynamically allocated the uplink control signals from the surrounding cells may be used to make the allocation decisions.

In ICIC the cells periodically share some metric, for example a channel quality indicator (CQI), of a frequency band via the backhaul communication interface. The cells make the decision to allocate a frequency band from its own measurements and the information received from the surrounding cells.

Small cell deployments within a larger macro cell efficiently use the spectrum and deliver the demand for the higher bit rate in certain areas of the cell. Generally the small cells use lower transmit power to serve a small area where the demand for the service is high, or in other words, they have cell radius' of a few meters to few hundred meters. Small cells may use wireless or wired backhaul connections to the back bone network.

Indoor and outdoor pico cells, femto cells and micro cells are the main types of small cells. The categorization of the small cells are based on, for example, their transmit power levels, deployment scenarios and/or the ownership of the small cell network. If different types of small cells are deployed within a macro cell the network is also called a heterogeneous network.

FIG. 1 illustrates a conventional heterogeneous network 100. As shown, a plurality of cells 105 are arranged in a hexagonal grid of cells. Each cell may include one or more antennas 115 associated with, for example, a base station (not shown). One or more of the cells may include a plurality of small cells 115 to support services in a localized area within a cell 105.

The widely used GSM, GPRS, UMTS, HSDPA and HSUPA wireless macro cellular standards were created by the third generation partnership project (3GPP). 3GPP recently finalized the LTE standard (Release 8) and is working towards their new standards namely, release 9 and 10. Release 10 is targeted to satisfy the IMT-advanced specifications. Currently several operators around the world are planning to deploy LTE as their future macro cellular network to deliver the demand for the higher data rates.

The down link frame structure 200 of the current 3GPP LTE standard (release 8) is illustrated in FIG. 2. As shown, the down link frame structure 200 may include a physical down link control channel (PDCCH) 205 which may be associated with the first 1-3 OFDM symbols in each sub-frame. The down link frame structure 200 may include a physical control format indicator channel (PCFICH) 210 associated with the first OFDM symbol in each sub-frame.

The down link frame structure 200 may further include a physical broadcast channel (PBCH) 215 once every 10 ms and for 4 OFDM symbols. The down link frame structure 200 may further include one or more primary synchronization signals (PSS) 225 and one or more secondary synchronization signals (SSS) 220 associated with an OFDM symbol.

In the down link, the primary synchronization signal (PSS) 225, secondary synchronization signal (SSS) 220 and physical broadcast channel (PBCH) 215 may be transmitted centered on a center frequency and they occupy 6 resource blocks or 72 sub carriers. In the time domain, the PSS 225 and SSS 220 may occupy 1 OFDM symbol each while the PBCH 215 may occupy 4 OFDM symbols.

The periodicity of the PSS 225, SSS 220 and PBCH 215 may be 5 ms, 5 ms and 10 ms, respectively. The PSS 225 and SSS 220 may be used for synchronization and they may carry some cell specific sequence for cell identification as well. The PBCH 215 may carry some system information common for all users in the cell including, for example, the allocated bandwidth information. As will be recalled, the PCFICH 210 and the PDCCH 205 may occupy the entire system bandwidth and they may be transmitted in the first 1-3 symbols in every subframe.

The subframe duration may be 1 ms. The PCFICH 210 may carry the control format indicator which indicates how many symbols are used to control transmission in a subframe. The PDCCH 205 may carry the user specific control information including, for example, resource allocation information. The down link physical channels may be knotted for interference rejection. The scrambling sequence generator may be reinitialized (except for PBCH 215) every subframe based on, for example, the cell id, subframe number and a mobile identity. This may randomize the interference between cells and between mobiles.

The up link frame structure 300 of the current 3GPP LTE standard (release 8) is illustrated in FIG. 3. As shown, the up link frame structure 300 may include one or more physical uplink control channels (PUCCH) 305. Although FIG. 3 shows several other channel blocks, they are not described herein for the sake of brevity. One skilled in the art will refer to 3GPP LTE standard (release 8) for a more detailed description of the up link frame structure 300.

The LTE up link transmission (physical uplink shared channel (PUSCH) and physical uplink control channel (PUCCH) 305) may use cell specific hopping for interference averaging. The PUCCH 305 may carry the uplink control information including, for example, scheduling requests, CQI, preferred matrix index (PMI), rank information (RI), and ACK/NACK information. Multiple user control information may be code division multiplexed (CDM) and transmitted in one PUCCH 305 region.

A PUCCH 305 region may consist of two blocks. 1 Resource Block (RB)×1 slot resource units on the both side of the system bandwidth as shown in FIG. 3. Depending on the system bandwidth, the number of PUCCH 305 regions varies. For a 10 MHz bandwidth there may be 8 PUCCH 305 regions. The periodicity of the PUCCH may be configurable by the base station via the down link control signals.

SUMMARY OF THE INVENTION

One embodiment includes a method that includes determining, by a macro cell, a binary sequence based on a number of symbols in a first frame associated with a macro cell. The method further includes performing, by the macro cell, an autocorrelation calculation on the binary sequence. The method further includes determining, by the macro cell, a time offset based on minimum values of the autocorrelation calculation. The method further includes broadcasting, by the macro cell, a control signal including the time offset to a plurality of small cells.

One embodiment includes a method that includes detecting, by the small cell, a frame associated with a macro cell. The method further includes receiving, by the small cell, a control signal including a time offset associated with the frame associated with the macro cell. The method further includes transmitting, by the small cell, a frame associated with the small cell synchronized with the frame associated with the macro cell and offset in time by the time offset.

One embodiment includes a method that includes detecting, by the small cell, a frame associated with a macro cell. The method further includes determining, by the small cell, a binary sequence based on a number of symbols in the frame associated with the macro cell. The method further includes performing, by the small cell, an autocorrelation or crosscorrelation calculation on the binary sequence.

The method further includes determining, by the small cell, a time offset based on minimum values of the autocorrelation or crosscorrelation calculation. The method further includes determining, by the small cell, a start time of the frame associated with the macro cell. The method further includes transmitting, by the small cell, the frame associated with the small cell synchronized with the frame associated with the macro cell and offset in time by the time offset.

One embodiment includes a method that includes determining if a small cell includes a closed subscriber group. The method further includes time-blanking, by the macro cell, a portion of the first frame associated with a synchronizing signal of the second frame if no closed subscriber group is present. The method further includes time-blanking, by the small cell, a portion of the frame associated with the small cell associated with a synchronizing signal of the frame associated with the macro cell if a closed subscriber group is present.

In one embodiment the determined time offset is associated with one of the 11, 17, 25, 31, 39, 45, 53 and 59 orthogonal frequency division multiplexing (OFDM) symbols if the physical control channel (PDCCH) associated with both the first and second frames occupy 3 OFDM symbols, if the binary sequence has a length of 140 symbols and if each element of the binary sequence represents an OFDM symbol.

In one embodiment the determined time offset is associated with one of the 11, 12, 16, 17, 25, 26, 30, 31, 39, 40, 44, 45, 53, 54, 58 and 59 orthogonal frequency division multiplexing (OFDM) symbols if the physical control channel (PDCCH) associated with both the first and second frames occupy 2 OFDM symbols, if the binary sequence has a length of 140 symbols and if each element of the binary sequence represents an OFDM symbol.

In one embodiment the determined time offset is associated with one of the 12, 17, 26, 31, 40, 45, 54 and 59 orthogonal frequency division multiplexing (OFDM) symbols if a physical control channel associated with the first and second frames occupy 3 and 2 OFDM symbols, respectively, if the binary sequence has a length of 140 symbols and if each element of the binary sequence represents an OFDM symbol.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

Figure 1:
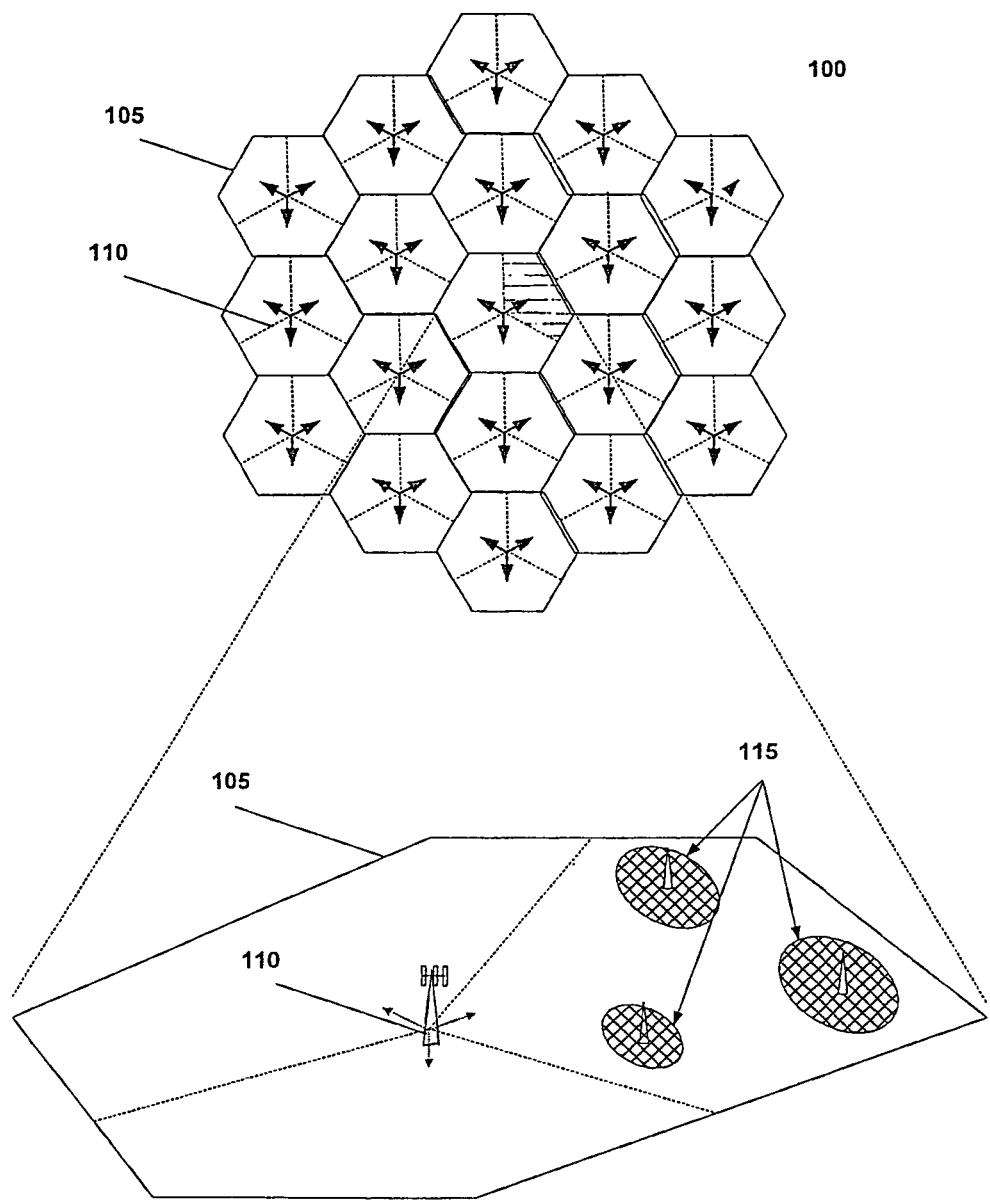
FIG. 1 illustrates a prior art system layout of a small cell overlay.
Figure 2:
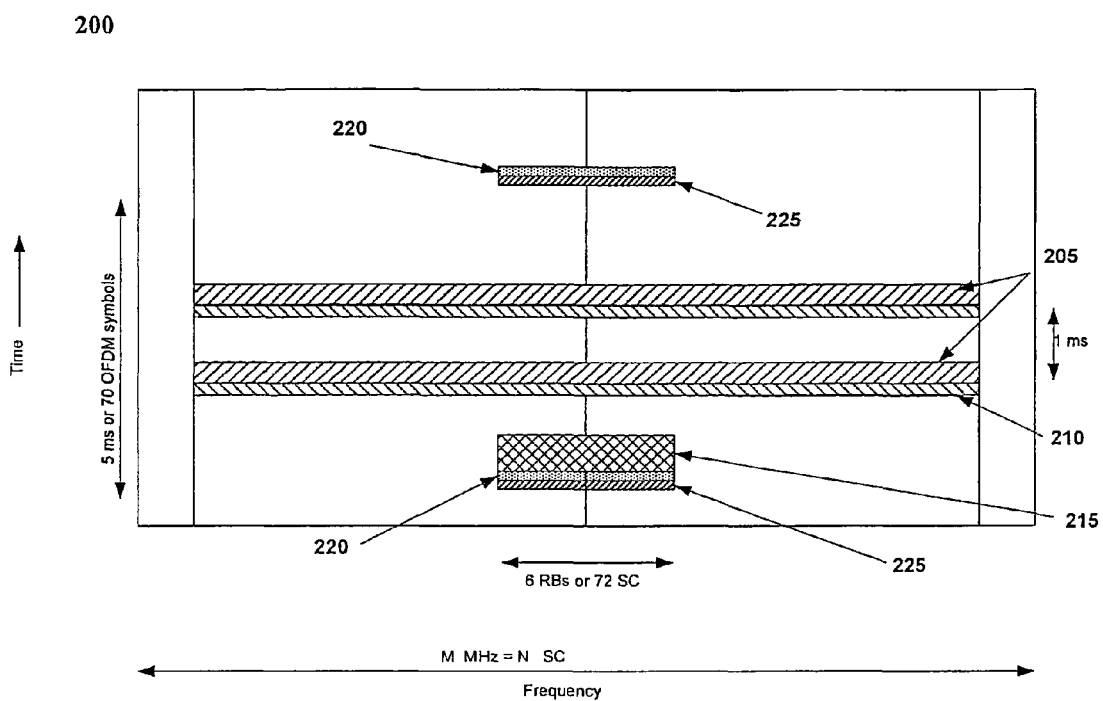
FIG. 2 illustrates a prior art 3GPP LTE (release 8) down link frame structure.
Figure 3:
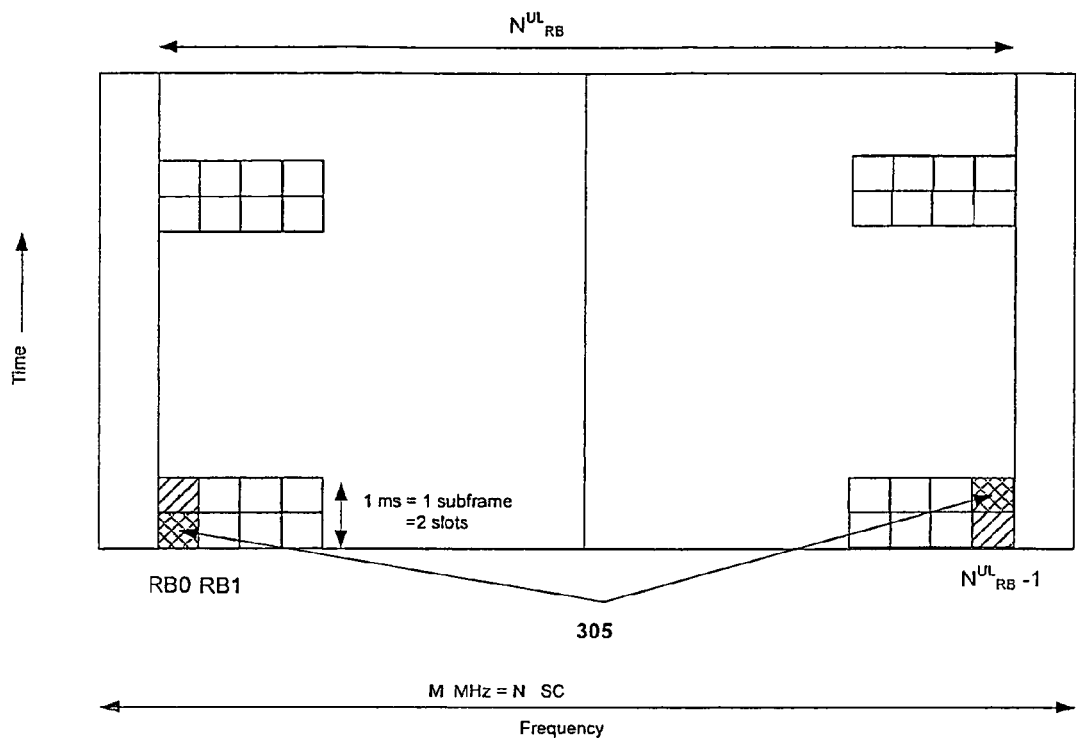
FIG. 3 illustrates a prior art 3GPP LTE (release 8) up link frame structure.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/ or structural elements may be reduced or exaggerated for

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

As used herein, the term "user equipment" may be considered synonymous to, and may hereafter be occasionally referred to, as a mobile, mobile unit, mobile station, mobile user, subscriber, user, remote station, access terminal, receiver, etc., and may describe a remote user of wireless resources in a wireless communication network. The term "base station" may be considered synonymous to and/or referred to as a base transceiver station (BTS), NodeB, extended NodeB, evolved NodeB, femto cell, pico cell, access point, etc. and may describe equipment that provides the radio baseband functions for data and/or voice connectivity between a network and one or more users.

Example embodiments relate to a method to overlay small cells on a same carrier in a 3GPP LTE (release 8) macro cell. The following goals form the basis of the method: (1) There is no change in the 3GPP LTE (release 8) air interface standard and the 3GPP LTE (release 8) frequency band where the macro cell is deployed; and (2) the small cell deployment is fully compatible with the current 3GPP LTE (release 8) standard and it should be forward compatible to future releases (e.g., release 9 & 10).

Therefore, implementation of the following methods may be accomplished in a heterogeneous network 100 including the macro cells and small cells such as in FIG. 1 via programs/firmware. One skilled in the art will understand that although example embodiments refer to macro cells, small cells, pico cells, femto cells, micro cells and etc., each of these cells is implemented through hardware such as a base station, a base transceiver station (BTS), NodeB, extended NodeB, evolved NodeB, femto cell, pico cell, access point, etc. and may describe equipment that provides the radio baseband functions for data and/or voice connectivity between a network and one or more users.

In the 3GPP LTE (release 8) standard, interference cancellation (IC) and inter-cell interference coordination (ICIC) for the control signals are not supported. The transmit power of the small cells may be relatively lower than that of the macro cell. If a small cell is overlaid in an existing macro cell and if the control signals of the small cells and the macro cells overlap, the small cell control signals may not be decoded accurately.

For mobile units that see low CQI from both the small cell and the macro cell a signal interference may be more detrimental. On the other hand, if the control signals and the traffic signals overlap the signals may be decoded with minimal performance loss. Using macro cell ICIC for the traffic signal the transmit power may be lowered (or turned off) when the small cell control and the macro traffic overlap.

In some types of small cells (e.g., femto cells) closed subscriber groups (CSG) may be present. The users in the CSG may only access that particular small cell and the other users, even if they are very close to the center of the small cell, may not be allowed access. Performance of those users who are not part of CSG may suffer.

Figure 4:
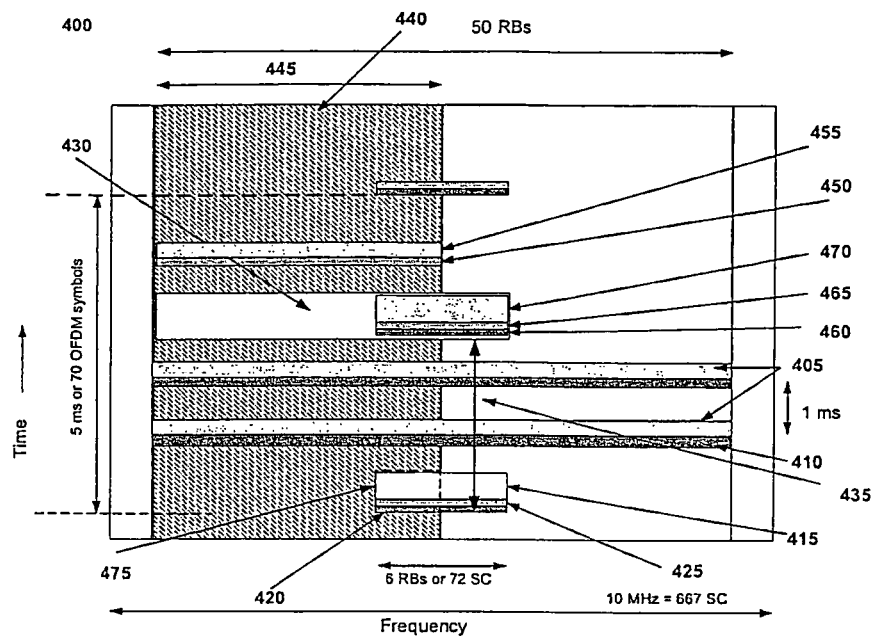
FIG. 4 illustrates a down link frame structure with small cell overlay according to an example embodiment.

FIG. 4 illustrates a down link frame structure 400 with small cell overlay according to an example embodiment. As shown, the down link frame structure 400 may include a macro cell physical down link control channel (PDCCH) 405. The down link frame structure 400 may further include a macro cell physical control format indicator channel (PCFICH) 410.

The down link frame structure 400 may further include a macro cell physical broadcast channel (PBCH) 415. The down link frame structure 400 may further include one or more macro cell primary synchronization signals (PSS) 425, and one or more macro cell secondary synchronization signals (SSS) 420.

As shown, the down link frame structure 400 may also include a macro cell time blanking slot 430. The down link frame structure 400 may also include a small cell frame structure 440 with an associated allocated band 445. The small cell frame structure 440 may include a small 411 PCFICH 450 and PDCCH 455. The down link frame structure 400 may further include a time offset 435 (k OFDM symbols) to prevent the collision of the macro cell PDCCH 405 and the small cell PDCCH 455. The down link frame structure 400 may further include a small cell PSS 460, SSS 465 and PBCH 470. The small cell frame structure 440 may further include a macro cell time blanking slot 475 (shown as the dashed line box).

Figure 5:
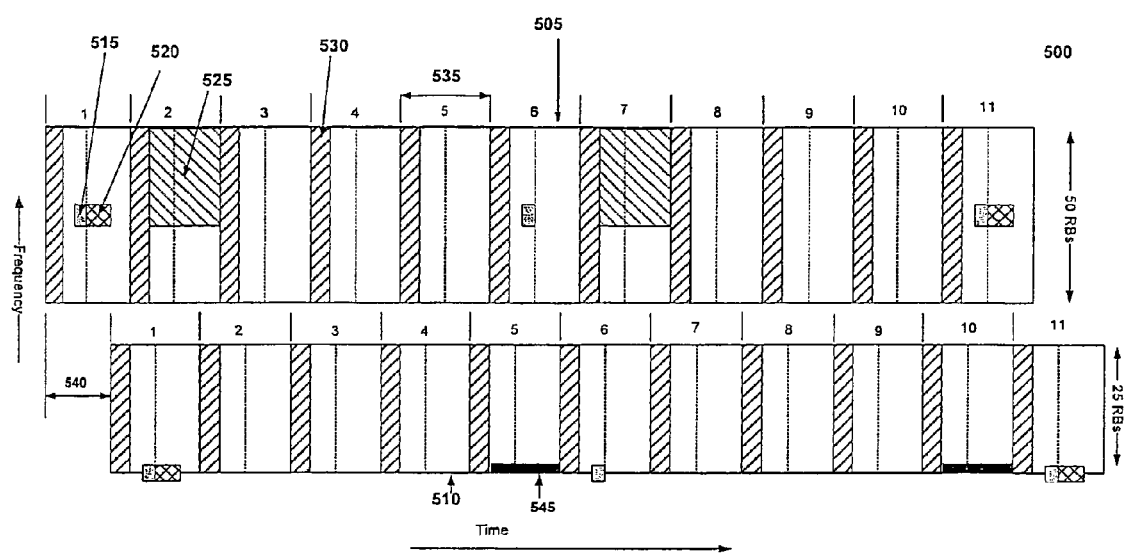
FIG. 5 illustrates a down link frame structure timing sequence for small cell overlay according to an example embodiment.

To comply with the goal that the macro cell LTE band should not be modified, example embodiments may transmit the small cell PSS 460, SSS 465 and PBCH 470 on the same center frequency as that of the macro cell. Example embodiments may have a time offset between a starting point of the macro cell PSS 425 and the small cell PSS 460 to avoid the control signal collisions as shown in FIGS. 4 and 5 (described below). Therefore, the small cell may be synchronized in time with the macro cell.

FIG. 5 illustrates a down link frame structure timing sequence 500 for small cell overlay according to an example embodiment. The down link frame structure timing sequence 500 may include a macro cell frame 505 and a small cell frame 510. The macro cell frame 505 may include the macro cell PSS 425 and SSS 450 referenced as block 515 occupying 2 OFDM symbols. The macro cell frame 505 may include a plurality of sub-frames 535. Each sub-frame 535 may be, for example, 2 slots equaling 1 ms having 14 OFDM symbols.

The macro cell frame 505 may include the macro cell PBCH 415 referenced as block 515 occupying 4 OFDM symbols. The macro cell frame 505 may include the macro cell time blanking slot 430 referenced as block 525 occupying an entire subframe in the time domain and the entire band may be allocated for the small cell in the frequency domain. The macro cell frame 505 may include the macro cell PDCCH 405 referenced as block 530 occupying maximum 3 OFDM symbols in every sub frames.

The small cell frame 510 is structured is the same the macro cell frame 505 except small cell frame 510 applies to the small cell. The small cell frame 510 structure will not be discussed in further detail for the sake of brevity. If a CSG associated with the small cell is present the small cell may time blank its synchronization signal transmission referenced as blocks 545 also referenced as 475 during the macro cell synchronization signal (PSS, SSS, PBCH) transmission. The time blanking of the small cell synchronization signal may help the non CSG users connect to the macro cell. The small cell frame 510 may include a time offset 540 in reference to the macro cell frame 505.

The time offset 540 may be equal to, for example, 11 OFDM symbols. To determine the desired time offset 540 the following method may be used. Determine a binary sequence based on a number of symbols in a frame associated with a macro cell. This determination may be performed by, for example, a base station of the macro cell or a base station of the small cell. The time offset information may be shared between the macro and the small cells via medium access control layer (MAC) messages or the X2 interface. The offsets may be static or semi static. For example, the offset may be saved at some entity which is connected to both the macro and the small cell. During the initial call setup or periodically the macro and the small cell may get the offset information from that particular entity.

For example, a binary sequence of length 140 where each element represents an OFDM symbol is formed corresponding to the 10 ms of the 3GPP LTE (release 8) frame. If a particular OFDM symbol is used for control or sync or PBCH the corresponding element is assigned "1" otherwise "0" is assigned. When the macro cell PDCCH 405 and the small cell PDCCH 455 occupies 3 OFDM symbols the sequence becomes:

```
"1 1 1 0 0 1 1 1 1 1 1 0 0 0
 1 1 1 0 0 0 0 0 0 0 0 0 0 0
 1 1 1 0 0 0 0 0 0 0 0 0 0 0
 1 1 1 0 0 0 0 0 0 0 0 0 0 0
```

-continued

```
1 1 1 0 0 0 0 0 0 0 0 0 0 0
1 1 1 0 0 1 1 0 0 0 0 0 0 0
1 1 1 0 0 0 0 0 0 0 0 0 0 0
1 1 1 0 0 0 0 0 0 0 0 0 0 0
1 1 1 0 0 0 0 0 0 0 0 0 0 0
1 1 1 0 0 0 0 0 0 0 0 0 0 0″
```

A periodic autocorrelation calculation may be performed on the binary sequence. An autocorrelation calculation is a cross-correlation of the binary sequence with itself. This calculation may be performed by, for example, a base station of the macro cell or a base station of the small cell. If the periodic autocorrelation of this sequence is plotted, the time offsets where, for example, valleys or minimums occur which may be the best candidates for the time offsets between the macro cell and the small cell frames.

Figure 6:
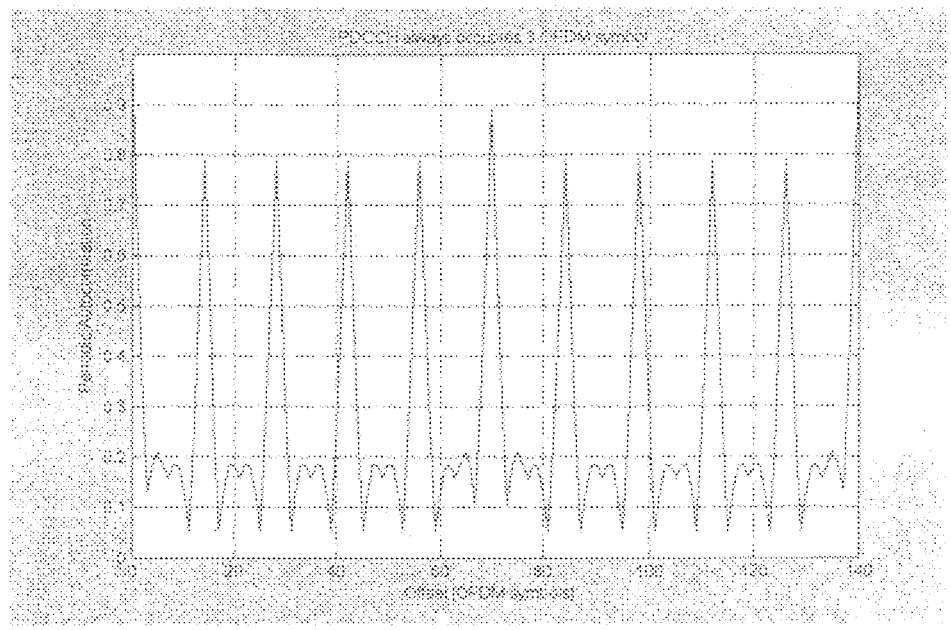
FIG. 6 illustrates a periodic autocorrelation versus offsets in OFDM symbols when PDCCH occupies 3 OFDM symbols according to an example embodiment.
Figure 7:
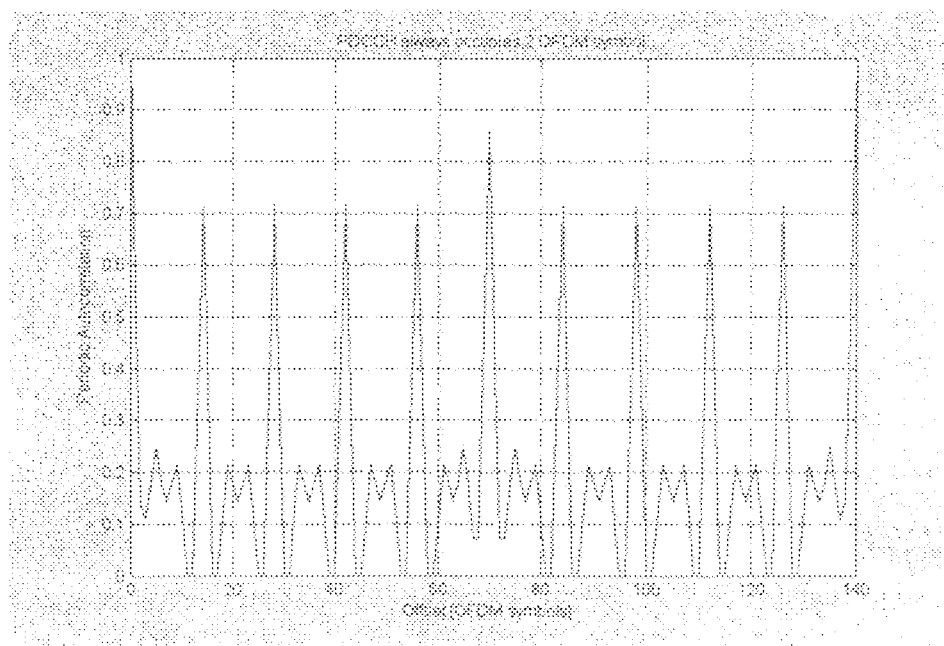
FIG. 7 illustrates a periodic autocorrelation versus offsets in OFDM symbols when PDCCH occupies 2 OFDM symbols according to an example embodiment.
Figure 8:
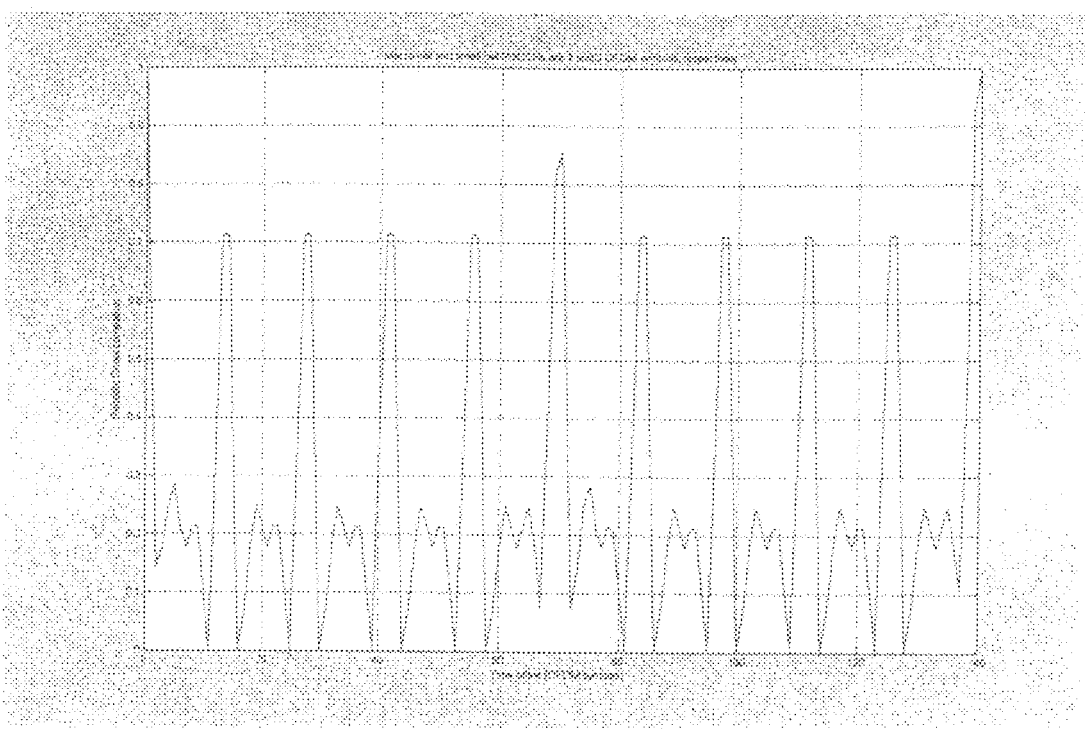
FIG. 8 illustrates a periodic autocorrelation versus offsets in OFDM symbols when PDCCH occupies 3 and 2 OFDM symbols according to an example embodiment.

FIGS. 6-8 illustrate a periodic autocorrelation versus offsets in OFDM symbols when the macro cell PDCCH 405 occupies 3 and 2 OFDM symbols respectively according to an example embodiment. For example, referring to FIG. 5, the control block (PDCCH) of sub-frame 7 in the macro cell frame 505 is overlapped by the sync block (PSS, SSS) of sub-frame 6 in the small cell frame 510.

As shown in FIG. 6, example offset values may be 11, 25, 39, 53, 17, 31, 45 and 59 OFDM symbols. If the time offset is 11 OFDM symbols as shown in FIG. 5 there is no control-control and sync-sync overlap but there is a one symbol overlap of control-sync in the blanked macro subframe.

Therefore, the correlation didn't go to zero in FIG. 6. If blanking is used in a sub-frame the macro cell PDCCH 405 may not occupy 3 OFDM symbols and a maximum of two symbols may be enough (there is no allocation info to carry). In the 2 OFDM symbols the first symbol is for the macro cell PCFICH 410+common reference signal (CRS) and the next symbol for the allocation info. Therefore, by allocating maximum 2 OFDM symbols for the macro cell PDCCH 405 in blanked sub-frames the correlation value may be zero or very close to zero.

As shown in FIG. 7, if the macro cell PDCCH 405 and the small cell PDCCH 455 occupies 2 OFDM symbols the possible offsets are 11, 12, 16, 17, 25, 26, 30, 31, 39, 40, 44, 45, 53, 54, 58 and 59 OFDM symbols. In this case, the correlation is zero at all possible offset values. Therefore, there is no overlap between control-control or sync-sync or control-sync at these offset values. Another observation is that the offset values for PDCCH 405 occupies 3 OFDM symbols is a subset of the offset values when the PDCCH 405 occupies 2 OFDM symbols.

If the PDCCH of the macro 405 occupies 3 OFDM symbols while small cell PDCCH 455 occupies 2 OFDM symbols, we construct 2 sequences correspond to macro and small cell as follows:

```
″1 1 1 0 0 1 1 1 1 1 1 0 0 0
 1 1 1 0 0 0 0 0 0 0 0 0 0 0
 1 1 1 0 0 0 0 0 0 0 0 0 0 0
 1 1 1 0 0 0 0 0 0 0 0 0 0 0
 1 1 1 0 0 0 0 0 0 0 0 0 0 0
 1 1 1 0 0 1 1 0 0 0 0 0 0 0
 1 1 1 0 0 0 0 0 0 0 0 0 0 0
 1 1 1 0 0 0 0 0 0 0 0 0 0 0
 1 1 1 0 0 0 0 0 0 0 0 0 0 0
 1 1 1 0 0 0 0 0 0 0 0 0 0 0″
``` and

```
″1 1 0 0 0 1 1 1 1 1 1 0 0 0
 1 1 0 0 0 0 0 0 0 0 0 0 0 0
 1 1 0 0 0 0 0 0 0 0 0 0 0 0
 1 1 0 0 0 0 0 0 0 0 0 0 0 0
 1 1 0 0 0 0 0 0 0 0 0 0 0 0
 1 1 0 0 0 1 1 0 0 0 0 0 0 0
 1 1 0 0 0 0 0 0 0 0 0 0 0 0
 1 1 0 0 0 0 0 0 0 0 0 0 0 0
 1 1 0 0 0 0 0 0 0 0 0 0 0 0
 1 1 0 0 0 0 0 0 0 0 0 0 0 0″
```

If the periodic cross correlation between these two sequences are calculated. The time offsets which give the lowest cross correlation may be the best time offsets. As shown in FIG. 8, if the macro cell PDCCH 405 and the small cell PDCCH 455 occupies 3 and 2 OFDM symbols the possible offsets are 12, 17, 26, 31, 40, 45, 54 and 59 OFDM symbols.

If the macro determines the time offset, the macro cell may broadcast a control signal including the time offset to the small cells in the heterogeneous network. The small cell may detect a frame associated with a macro cell. If the small cell is to make the time offset calculation, the small cell uses the detected frame in that calculation.

Otherwise, the small cell may receive a control signal including a time offset from the macro cell. The small cell transmits a frame associated with the small cell synchronized with the frame associated with the macro cell and offset in time by the time offset. Therefore, the small cell frame may be overlaid, in-band, on the macro cell frame.

The small cell PBCH 470 of the small cell carries information on the band allocated for the small cell. If the band allocated for the small cell is smaller than the macro cell band the small cell band may hop within the macro band for interference averaging. This hopping may be enabled using the small cell PBCH 470.

As the transmit powers of the small cells are low, mobiles which experience low CQI from small cells may not see the small cell sync signals due to interference from the macro cell. To avoid this situation in the down link, the macro cell time-blanks the traffic signal during the small cell PSS 460, SSS 465 and PBCH 470 transmission as shown in FIG. 4.

If there is a closed subscriber group (CSG) small cell present, the mobiles which are located very close to the small cell site but not in the CSG may have difficulty in decoding the synchronization signals from the macro due to the interference from the small cell. Therefore, the small cell time blanks its traffic transmission during macro cell PSS 420, SSS 425 and PBCH 415 transmission.

Figure 9:
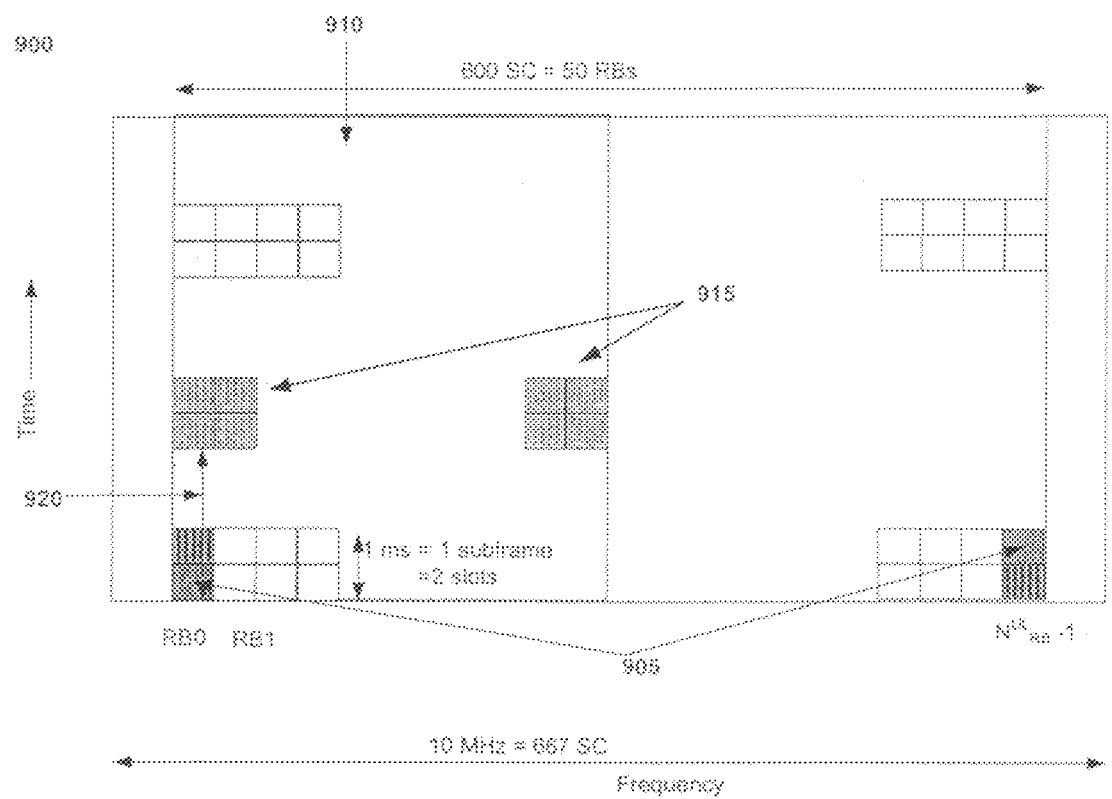
FIG. 9 illustrates an up link frame structure with small cell overlay according to an example embodiment.

FIG. 9 illustrates an up link frame structure 900 with small cell overlay according to an example embodiment. As shown, the up link frame structure 900 may include a small cell uplink frame 910. The up link frame structure 900 may include one or more macro cell physical uplink control channels (PUCCH) regions 905. The small cell up link frame 910 may include one or more small cell physical uplink control channels (PUCCH) regions 915. The small cell PUCCH may include a time offset 920.

Although FIG. 9 shows several other channel blocks, they are not described herein for the sake of brevity. One skilled in the art will refer to 3GPP LTE standard (release 8) for a more detailed description of the up link frame structure 900.

In the LTE up link the macro cell PUCCH 905 may occupy both edges of the up link spectrum. The PUCCH 905 and Physical Uplink Shared Channel (PUSCH) use cell specific frequency hopping and CDM. This may provide some form of orthogonality in the up link. If a CSG associated with a small cell is present, the mobiles which are not in the CSG but closer to the small cell site may connect to the macro cell for the up link. Therefore, they need to transmit the signals at the larger power associated with the macro cell.

This will cause large interference to the CSG users of the small cell at the small cell receiver. This may also be referred to as the near-far problem. When the CSG users see the larger interference the small cell may ask the CSG users to transmit at a larger power. This may interfere with the signals of the mobiles connected to the macro cell. Eventually all the mobiles end up transmitting at the maximum power and cause interference to other co-channel users.

If the small cells are deployed in the macro cell and if their PUCCHs 905, 915 overlap each other, the macro cell may not be able to decode the PUCCH 905 from non-CSG mobiles due to the near-far problem. Example embodiments describe a method for determining a time offset in the down link. The same time offset is applied in the up link between the macro cell and the small cell PUCCHs 905, 915 to prevent their collision. If a CSG associated with a small cell is present, applying the time offset may also prevent collisions.

When multiple small cells are deployed on the same carrier in a macro cell, the same band may be allocated or different non-overlapping bands may be allocated for small cells. The small cells and the macro cell transmit their PSS (460, 420), SSS (465, 425) and PBCH (470, 415) on the same frequency resources or carrier. If the small cells are well separated in space they may not interfere with each. Therefore, the same time offset may be used by all the small cells. Otherwise, different time offsets should be used in small cells to minimize the interference.

While example embodiments have been described in relation to 3GPP LTE (release 8), example embodiments are not limited thereto. One skilled in the art will understand how to apply the example embodiments to other technologies be they standard technologies or not.

While example embodiments have been particularly shown and described, it will be understood by one of ordinary skill in the art that variations in form and detail may be made therein without departing from the spirit and scope of the claims.

We claim:

1. A method, comprising:
   determining, by a macro cell, a binary sequence based on a number of symbols in a first frame associated with the macro cell;
   performing, by the macro cell, a cross-correlation of the binary sequence with itself;
   determining, by the macro cell, a time offset based on minimum values of the cross-correlation calculation, the time offset being associated with a first plurality of orthogonal frequency division multiplexing (OFDM) symbols upon a physical control channel associated with both the first frame and a second frame occupying a second plurality of OFDM symbols, upon the binary sequence having a length equal to a first threshold and upon each element of the binary sequence representing an OFDM symbol; and
   broadcasting, by the macro cell, a control signal including the time offset to a plurality of small cells.

2. The method of claim 1, further comprising:
   receiving, by the macro cell, the second frame associated with one of the small cells;
   determining, by the macro cell, if the small cell associated with the second frame includes a closed subscriber group; and
   time-blanking, by the macro cell, a portion of the first frame associated with a synchronizing signal of the second frame upon no closed subscriber group being present.

3. The method of claim 1, wherein the first plurality of OFDM symbols include 11, 17, 25, 31, 39, 45, 53 and 59 OFDM symbols,
   the second plurality of OFDM symbols includes 3 OFDM symbols, and
   the first threshold is 140 symbols.

4. The method of claim 1, wherein the first plurality of OFDM symbols include 11, 12, 16, 17, 25, 26, 30, 31, 39, 40, 44, 45, 53, 54, 58 and 59 OFDM symbols,
   the second plurality of OFDM symbols includes 2 OFDM symbols, and
   the first threshold is 140 symbols.

5. The method of claim 1, wherein the first plurality of OFDM symbols include 12, 17, 26, 31, 40, 45, 54 and 59 OFDM symbols,
   the second plurality of OFDM symbols includes at least one of 2 and 3 OFDM symbols, and
   the first threshold is 140 symbols.

6. A method, comprising:
   detecting, by a small cell, a first frame associated with a macro cell;
   determining, by the small cell, a binary sequence based on a number of symbols in the first frame;
   performing, by the small cell, a cross-correlation of the binary sequence with itself;
   determining, by the small cell, a time offset based on minimum values of the cross-correlation calculation, the time offset being associated with a first plurality of orthogonal frequency division multiplexing (OFDM) symbols upon a physical control channel associated with both the first frame and a second frame of the small cell occupying a second plurality of OFDM symbols, upon the binary sequence having a length equal to a first threshold and upon each element of the binary sequence representing an OFDM symbol;
   determining, by the small cell, a start time of the first frame; and
   transmitting, by the small cell, the second frame synchronized with the first frame and offset in time by the time offset.

7. The method of claim 6, further comprising:
   determining, by the small cell, if a closed subscriber group is present; and time-blanking, by the small cell, a portion of the first frame associated with a synchronizing signal of the second frame upon a closed subscriber group being present.

8. The method of claim 6, wherein the first plurality of OFDM symbols include 11, 17, 25, 31, 39, 45, 53 and 59 OFDM symbols, the second plurality of OFDM symbols includes 3 OFDM symbols, and the first threshold is 140 symbols.

9. The method of claim 6, wherein the first plurality of OFDM symbols include 11, 12, 16, 17, 25, 26, 30, 31, 39, 40, 44, 45, 53, 54, 58 and 59 OFDM symbols, the second plurality of OFDM symbols includes 2 OFDM symbols, and the first threshold is 140 symbols.

10. The method of claim 6, wherein the first plurality of OFDM symbols include 12, 17, 26, 31, 40, 45, 54 and 59 OFDM symbols, the second plurality of OFDM symbols includes at least one of 2 and 3 OFDM symbols, and the first threshold is 140 symbols.

* * * * *